United States Patent
Wiel

[11] Patent Number: 6,088,646
[45] Date of Patent: Jul. 11, 2000

[54] FUZZY LOGIC ANTISKID CONTROL SYSTEM FOR AIRCRAFT

[75] Inventor: Colin T. Wiel, Kent, Wash.

[73] Assignee: The Boeing Company, Seattle, Wash.

[21] Appl. No.: 08/736,650

[22] Filed: Oct. 25, 1996

Related U.S. Application Data

[63] Continuation of application No. 08/350,927, Dec. 7, 1996, abandoned.

[51] Int. Cl.⁷ .............................. B60T 7/12; G06F 17/00
[52] U.S. Cl. ............................. 701/77; 244/111; 303/126
[58] Field of Search .................. 701/77, 70, 71; 303/100, 194, 126; 244/111

[56] References Cited

U.S. PATENT DOCUMENTS

| | | | |
|---|---|---|---|
| 4,195,803 | 4/1980 | Favre et al. | 244/111 |
| 4,327,948 | 5/1982 | Beck et al. | 303/96 |
| 4,640,475 | 2/1987 | Zoerb | 244/111 |
| 4,773,013 | 9/1988 | Crapanzano et al. | 364/426.02 |
| 4,842,342 | 6/1989 | Takahashi et al. | 303/102 |
| 4,852,007 | 7/1989 | Yasunobu et al. | 364/426.01 |
| 5,001,640 | 3/1991 | Matsumoto et al. | 364/426.01 |
| 5,018,689 | 5/1991 | Yasunobu et al. | 246/182 B |
| 5,019,774 | 5/1991 | Rosenberg | 324/174 |
| 5,024,491 | 6/1991 | Pease, Jr. et al. | 303/93 |
| 5,050,940 | 9/1991 | Bedford et al. | 303/100 |
| 5,082,081 | 1/1992 | Tsuyama et al. | 180/197 |
| 5,173,860 | 12/1992 | Walenty et al. | 364/426.02 |
| 5,227,678 | 7/1993 | Han et al. | 307/443 |
| 5,229,955 | 7/1993 | Nishiwaki et al. | 364/550 |
| 5,245,695 | 9/1993 | Basehore | 395/3 |
| 5,289,095 | 2/1994 | Ushiyama | 318/560 |
| 5,302,007 | 4/1994 | Morita et al. | 303/9.73 |
| 5,358,317 | 10/1994 | Cikanek | 303/100 |
| 5,388,895 | 2/1995 | Negrin | 303/103 |
| 5,397,973 | 3/1995 | Dommermuth | 318/628 |
| 5,411,323 | 5/1995 | Takahashi et al. | 303/20 |
| 5,416,709 | 5/1995 | Yeh et al. | 364/426.02 |
| 5,425,131 | 6/1995 | Basehore | 395/3 |
| 5,459,816 | 10/1995 | Basehore et al. | 395/3 |
| 5,474,368 | 12/1995 | Sano | 303/163 |
| 5,483,446 | 1/1996 | Momose et al. | 364/424.01 |
| 5,497,063 | 3/1996 | Day et al. | 318/610 |
| 5,497,449 | 3/1996 | Miyazawa | 395/61 |
| 5,524,176 | 6/1996 | Narita et al. | 395/22 |
| 5,539,642 | 7/1996 | Wiel | 364/426.01 |

*Primary Examiner*—William A. Cuchlinski, Jr.
*Assistant Examiner*—Edward Pipala
*Attorney, Agent, or Firm*—Conrad O. Gardner

[57] ABSTRACT

An antiskid control system for aircraft braking consisting of an iterative system having inputs including wheel speed, time since touchdown and the value of the control current generated by the previous iteration. Utilizing the previous value and applying fuzzy logic rules, the system modifies itself to adjust for variations in the coefficient of friction between the wheels and the runway.

10 Claims, 4 Drawing Sheets

FUZZY LOGIC ANTISKID CONTROL SYSTEM FOR AIRCRAFT

This application is a continuation of prior copending application Ser. No. 08/350,927, filed Dec. 7, 1996, now abandoned.

FIELD OF THE INVENTION

The present invention relates to an antiskid brake control system and more particularly to an antiskid brake control system utilizing fuzzy logic rules utilizing time since touchdown as an input and further responsive to antiskid control current generated by the previous iteration.

BACKGROUND OF THE INVENTION

Fuzzy inference means has heretofore been utilized in a detecting road surface frictional coefficient in automotive applications as shown in U.S. Pat. No. 5,229,955 to Nishiwaki et al.

U.S. Pat. No. 4,843,342 to Takahashi et al. discloses an antiskid brake control system using fuzzy logic rules. It requires a wheel speed input and sensor for vehicle body behavior (the exemplary system uses acceleration). In contrast, the present system hereinafter described utilizes only wheel speed and a clock; all other quantities are derived therefrom. U.S. Pat. No. 5,001,640 to Matsumoto et al. suggests a servo control system consisting of a controlled object, an actuator for controlling it, a sensor monitoring the controlled quantity, and a control device employing fuzzy reasoning. It is implied that the inputs are limited to reduce the required calculations and improve the response time of the system. The exemplary system in Matsumoto et al. is an antiskid brake control system for an automobile. However, instead of monitoring only the controlled quantity as hereinafter described, the system shown in Matsumoto et al. uses both wheel speeds and applied hydraulic brake pressures as inputs.

SUMMARY OF THE INVENTION

An aircraft brake antiskid system employing fuzzy logic in an iterative system. Parameters include wheel speed, time since touchdown, and value of the control current generated by a previous iteration.

DETAILED DESCRIPTION OF THE INVENTION

Introduction

The antiskid system controls the amount of electric current sent to an electronic servo valve, which in turn meters hydraulic pressure from the brakes of the aircraft. Skids are detected by a sudden decrease of wheel speed. When a skid is detected, the controller immediately sends a current to the antiskid valve to release the pressure in that brake.

Currently existing systems serve this objective, but not perfectly. The present fuzzy logic antiskid system was developed in order to yield better braking efficiencies under a wide range of conditions.

Description Of Fuzzy Inference Process

The four fuzzy inference systems which are utilized in the present fuzzy antiskid algorithm utilize the product-sum-gravity method of inference, also called sum-product inference. Each takes multiple inputs, $x_1$ through $x_n$, and calculates a single output, y.

The algorithm is described hereinafter. This description is divided into two sections, viz. Knowledge Base, and Inferencing. The former describes how the rules of inference are defined mathematically, and the latter describes how the knowledge base is accessed to make a decision.

Knowledge Base

The knowledge of a fuzzy inference system is stored in a set of fuzzy if . . . then rules. Each rule is of the form:

If $x_1$ is $A_{i1}$ AND $x_2$ is $A_{i2}$ and . . . $x_n$ is $A_{in}$ THEN y is $B_i$. The rule can be divided into an antecedent part, "If $x_1$ is $A_{i1}$ AND $x_2$ is $A_{i2}$ and . . . $x_n$ is $A_{in}$", and a consequent part, "THEN y is $B_i$". Here $A_{ij}$'s are fuzzy sets. The $B_i$'s are scalar values.

A fuzzy set is a set which allows membership values in the [0,1] interval. (Conventional set theory allows membership values of 0 and 1, only.) The fuzzy set is defined on a universal set by a membership function which maps all elements of the universal set to the [0,1] interval:

$\mu A_{ij}(x): X \to [0.1]$.

Typically, a rule base will contain two to 50 rules, although larger rule bases have been used for some highly complex applications. A complete rule base has the form:

$R_1$: If $x_1$ is $A_{11}$ AND $x_2$ is $A_{12}$ and . . . $x_n$ is $A_{1n}$ THEN y is $B_1$ $R_2$: If $x_1$ is $A_{21}$ AND $X_2$ is $A_{22}$ and . . . $x_n$ is $A_2$n THEN y is $B_2$ $R_m$: If $x_1$ is $A_{m1}$ AND $X_2$ is $A_{m2}$ and . . . $x_n$ is $A_{mn}$ THEN y is $B_m$

Inferencing

In the fuzzy inference process, all of the rules come into play to some degree. The degree to which a rule comes into play, called the weight, is equal to the degree to which the antecedent condition of the rule is satisfied. The weights of the rules are then used in taking the weighted average of the outputs of the rules.

The weight of a rule is determined as:

$W_i = \mu A_{i1}(x_1) \times \mu A_{i2}(x_2) \times \ldots \times \mu A_{in}(x_n)$ The inference output, y, is calculated as follows:

$$y = \frac{\sum_{i=0}^{m} W_i \times B_i}{\sum_{i=0}^{m} W_i}$$

Algorithm Description

Figure 1:
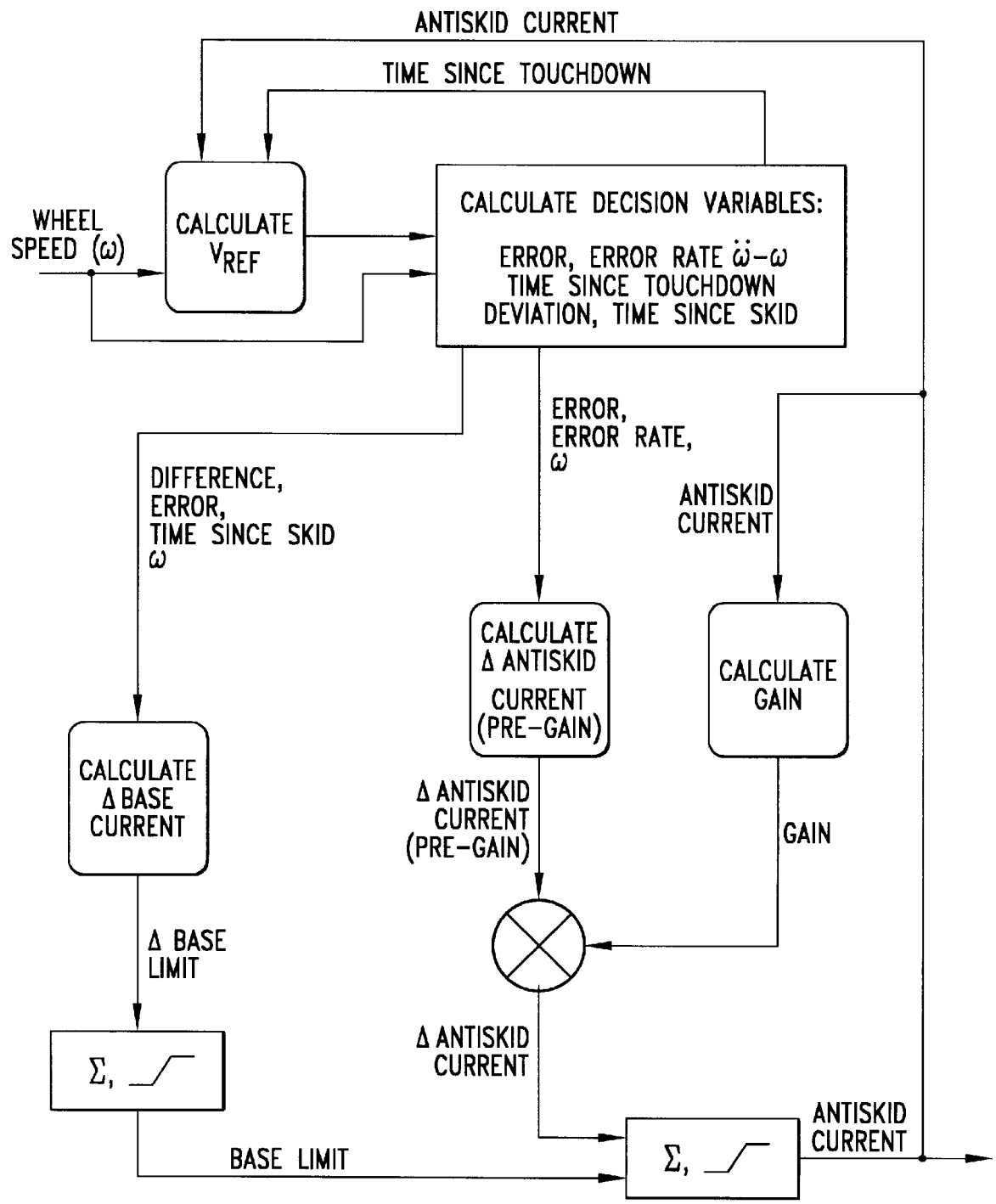
FIG. 1 is a block diagram of the present aircraft brake antiskid system including an algorithm diagram.

The Fuzzy antiskid algorithm as shown in FIG. 1 receives wheel speed as an input, and determines the level of current to be sent to the antiskid valve. The algorithm uses four separate fuzzy inference systems to determine the values of four intermediate variables which are then used to determine the antiskid current level. The four intermediate variables are reference velocity rate limit, change in antiskid current (before gain and limit are applied), gain, and change in base limit.

The reference velocity rate limit is used to establish a reference velocity. By comparing the wheel speed to the reference velocity, skids are recognized. The error, which is the difference between the reference velocity and the wheel speed, indicates the depth of a skid.

The error, along with the derivative of error and second derivative of wheel speed, are used to determine the change in antiskid current. This value is then multiplied by a gain and added to the previous antiskid current. The antiskid current is then limited to a maximum of 55 mA and a minimum of the base limit level.

The gain is determined by how slippery the runway is. The base limit level is determined primarily by the deviation, which is the difference between the antiskid current level and the base limit itself. The amount of time since a skid, the error, and the derivative of wheel speed are also used in determining the base limit level.

The fuzzy antiskid algorithm can be divided into eight functional components, each of which is discussed below.

1) Estimate Reference Velocity (Fuzzy Inference)
2) Calculate Decision Variables
3) Determine Change in Antiskid Current (Fuzzy Inference)
4) Determine Gain (Fuzzy Inference)
5) Determine Change in Base Limit (Fuzzy Inference)
6) Sum and Limit Base Limit
7) Sum and Limit Antiskid Current
8) Send Current to Valve Estimate Airplane Velocity (Fuzzy Inference)

The airplane velocity is estimated to provide a reference to which wheel speed can be compared to recognize a skid (reference velocity). This reference velocity is estimated based solely on the wheel speed, as no other input is provided to the antiskid system. Each cycle of the algorithm, after the wheel speed is read, the previous reference velocity is compared to the new wheel speed reading. Based on this comparison, a new reference velocity is determined. The approach taken is described as follows:

If the reference velocity is less than the wheel speed, the reference velocity should be increased to match the wheel speed, because in general the wheels can not go faster than the airplane.

If the reference velocity is greater than or equal to the wheel speed then the new reference velocity is taken as the wheel speed, provided that the decrease in reference velocity does not exceed a limiting value, the reference velocity rate limit. If the decrease in reference velocity would exceed the reference velocity rate limit, then it is assumed that the airplane is skidding. In this case the new value of reference velocity is taken as the previous value of the reference velocity less the reference velocity rate limit.

The reference velocity rate limit is determined based on how slippery the runway is. A fuzzy inference system is used.

The fuzzy inference system uses the strategy that if the base limit is high then the runway is slippery, and the reference velocity should be decreased slowly. If the base limit is low then the runway is not slippery, and the reference velocity should be decreased more rapidly.

Additionally, immediately after touchdown, a couple of seconds are required for the base limit to be established. During this period, the reference velocity rate limit is fixed at its maximum value. This is handled by including time since touchdown as an input to the inference system.

Figure 2:
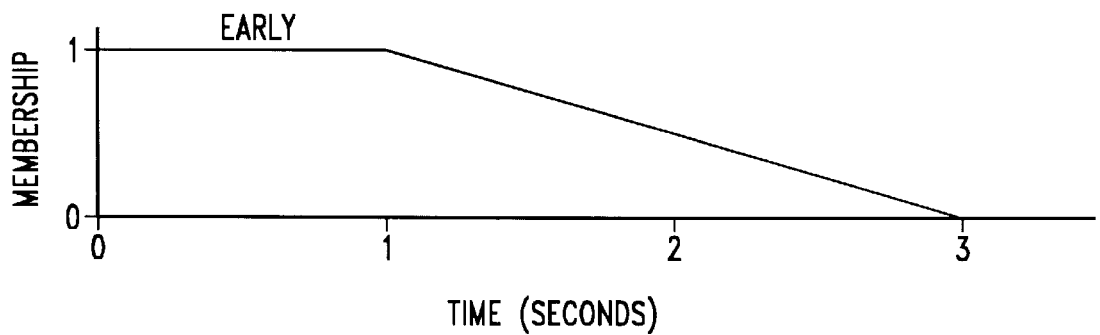
FIG. 2 and FIG. 3 are diagrams of the reference velocity fuzzy sets utilized in the present system.
Figure 3:
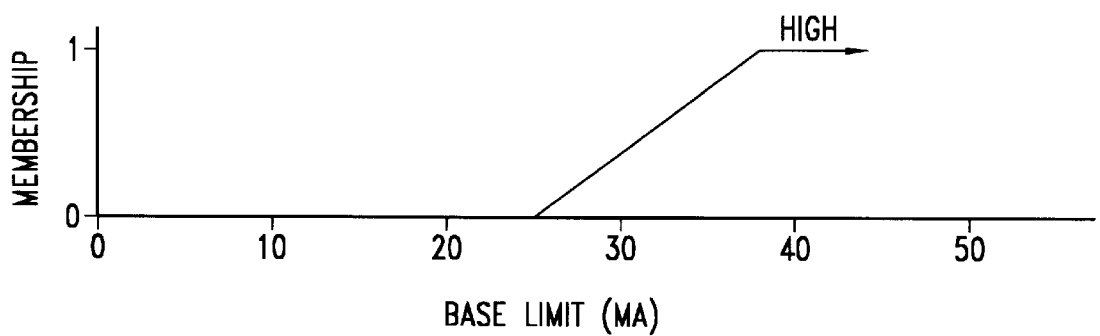

The rules are now described and the fuzzy sets shown in FIGS. 2 and 3. Reference Velocity Rules:

1. If Base Limit is High and Time is Not Early Then Reference Velocity Rate Limit=12;
2. If Base Limit is Not High Then Reference Velocity Rate Limit=20.

Calculate Decision Variables

The following variables which are calculated to be used in subsequent calculations: error, error rate, derivative of wheel speed ($\omega$), second derivative of wheel speed ($\omega$), deviation, time since touchdown, and time since skid. These variables are computed as follows:

error (radians/sec)=reference wheel speed−desired wheel speed;

error rate (radians/sec$^2$)=error−previous error)/timestep;

$\omega$ (radians/sec$^2$)=(($\omega$−previous $\omega$)/timestep;

$\omega$ (radians/sec$^3$)=($\omega$−previous $\omega$)/timestep;

deviation=antiskid current—base limit;

time since touchdown (seconds)=time since spinup signal is received from simulation;

time since skid (seconds)=time since error was above one ft/sec.

Determine Change in Antiskid Current (Fuzzy Inference)

The release current is the current sent to the antiskid valve. If there is a skid, the release current deviates significantly from the base limit. When the skid is finished, the release current returns to the base limit.

The system uses error, error rate, and $\omega$ to recognize how severe the current skid is (if there is a skid), and how to respond. For example, if the error is small, the error rate is positive, and $\omega$ is negative, the wheel is starting to go into a skid. In that case, the antiskid current increases by a large amount, 1.5 mA. If, for example, the error is large, the error rate is zero, and $\omega$ is positive, the wheel is just starting to recover from a skid, and the antiskid current should start to return to the base limit. In this case, the antiskid current decreases by 2.0 mA.

Figure 4A:
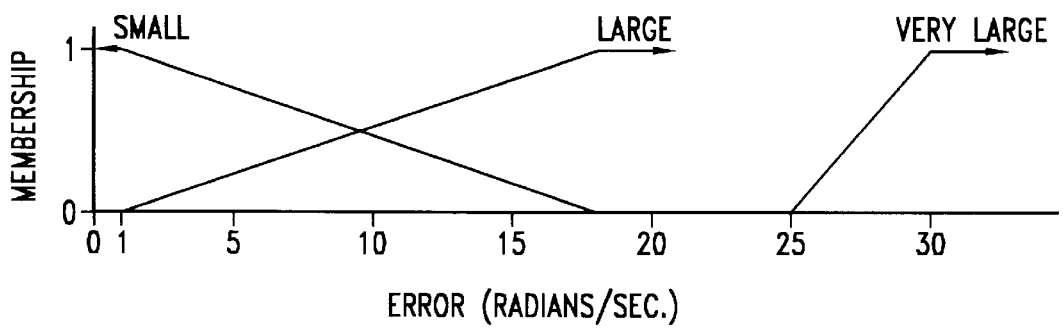
FIGS. 4 A, B, and C are diagrams of the antiskid current fuzzy sets.
Figure 4B:
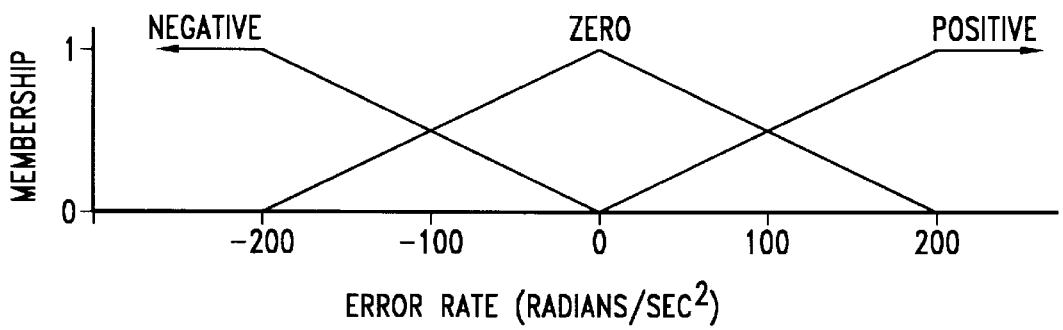
Figure 4C:
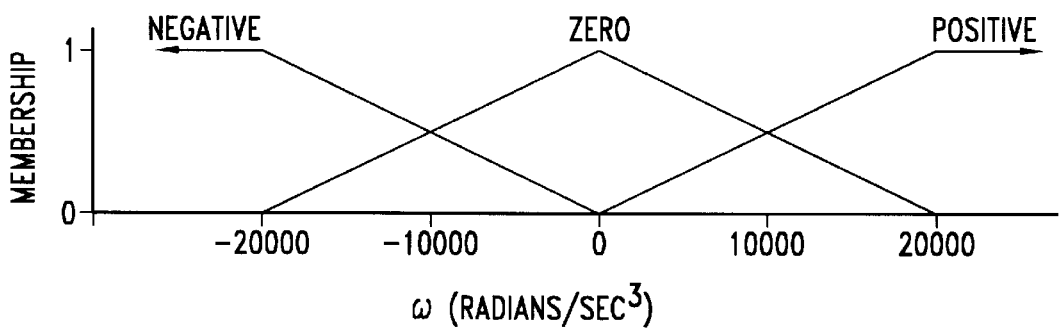

The rules are now described and the fuzzy sets shown in FIGS. 4A, B and C.

Antiskid Current Rules:

1. If Error is Small and Error Rate is Negative and $\omega$ is Negative Then $\Delta$Current=0.9 mA.
2. If Error is Small and Error Rate is Negative and $\omega$ is Zero Then $\Delta$Current=0.3 mA.
3. If Error is Small and Error Rate is Negative and $\omega$ is Positive Then $\Delta$Current=−2.0 mA.
4. If Error is Small and Error Rate is Zero and $\omega$ is Negative Then $\Delta$Current=1.2 mA.
5. If Error is Small and Error Rate is Zero and $\omega$ is Zero Then $\Delta$Current=0.0 mA.
6. If Error is Small and Error Rate is Zero and $\omega$ is Positive Then $\Delta$Current=−2.0 mA.
7. If Error is Small and Error Rate is Positive and $\omega$ is Negative Then $\Delta$Current=1.5 mA.
8. If Error is Small and Error Rate is Positive and $\omega$ is Zero Then $\Delta$Current=0.8 mA.
9. If Error is Small and Error Rate is Positive and $\omega$ is Positive Then $\Delta$Current=−2.0 mA.
10. If Error is Large and Error Rate is Negative and $\omega$ is Negative Then $\Delta$Current=1.0 mA.
11. If Error is Large and Error Rate is Negative and $\omega$ is Zero Then $\Delta$Current=0.3 mA.
12. If Error is Large and Error Rate is Negative and $\omega$ is Positive Then $\Delta$Current=−2.0 mA.
13. If Error is Large and Error Rate is Zero and $\omega$ is Negative Then $\Delta$Current=1.5 mA.

14. If Error is Large and Error Rate is Zero and ω is Zero Then ΔCurrent=0.6 mA.

15. If Error is Large and Error Rate is Zero and ω is Positive Then ΔCurrent=-2.0 mA.

16. If Error is Large and Error Rate is Positive and ω is Negative Then ΔCurrent=1.5 mA.

17. If Error is Large and Error Rate is Positive and ω is Zero Then ΔCurrent=1.2 mA.

18. If Error is Large and Error Rate is Positive and ω is Positive Then ΔCurrent=-2.0 mA.

19. If Error is Very Large and ω is Positive Then ΔCurrent=1.5 mA.

20. If Error is Very Large and Error Rate is Positive and ω is Not Negative Then ΔCurrent=3.0 mA.

Determine Gain (Fuzzy Inference)

The gain decreases the effective gain of the system during slippery conditions, and increases the effective gain during dry conditions. The gain ranges from a value of 2.1 for dry runway conditions to 0.8 for very slippery runway conditions. An indication of the degree to which the runway is slippery is provided by the base limit, as it was for the reference velocity fuzzy inference. If the base current is low, the runway is not slippery. If the base current level is high, then the runway is slippery.

Figure 5:
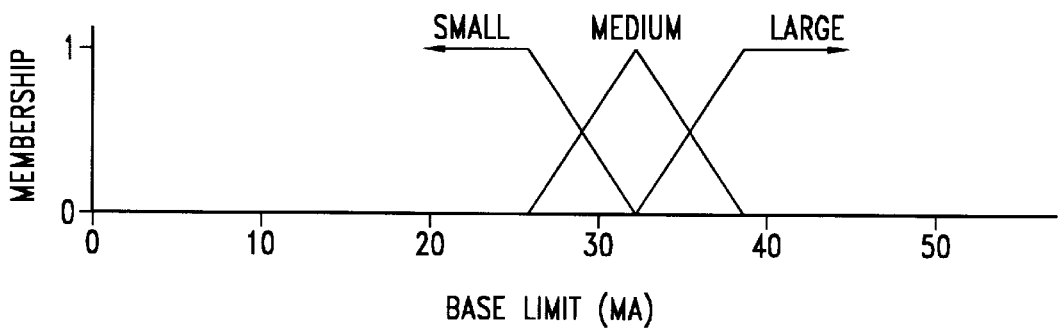
FIG. 5 is a diagram showing gain fuzzy sets for base limits that are small, medium, and large; and, FIGS. 6 A, B, C, and D are diagrams illustrative of the base limit fuzzy sets utilized in the present antiskid system of FIG. 1.
Figure 6A:
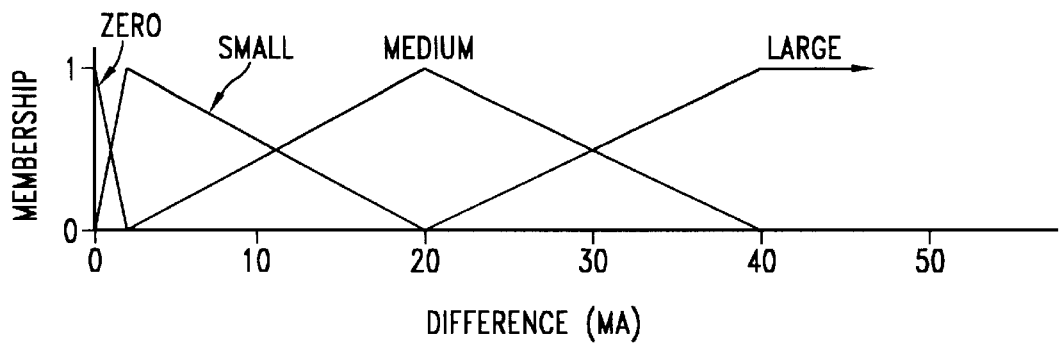
Figure 6B:
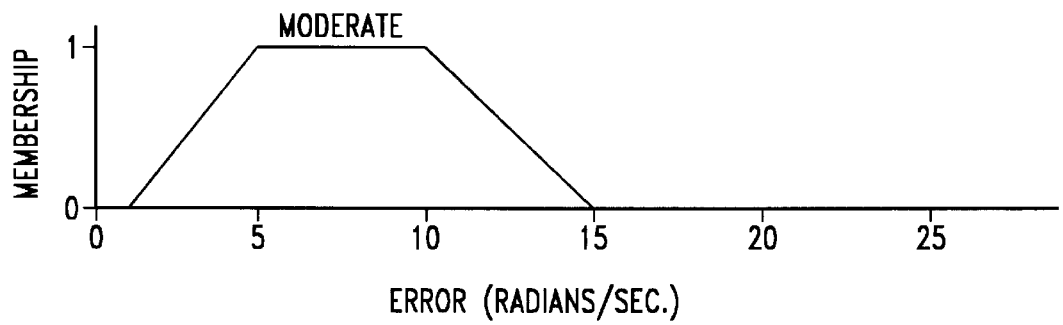
Figure 6C:
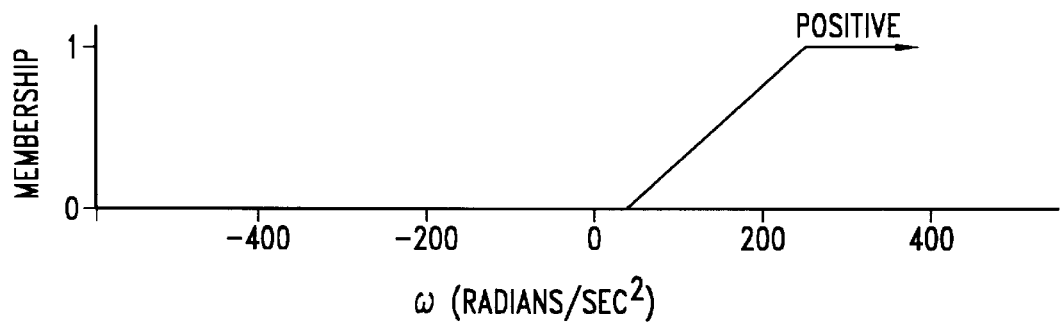
Figure 6D:
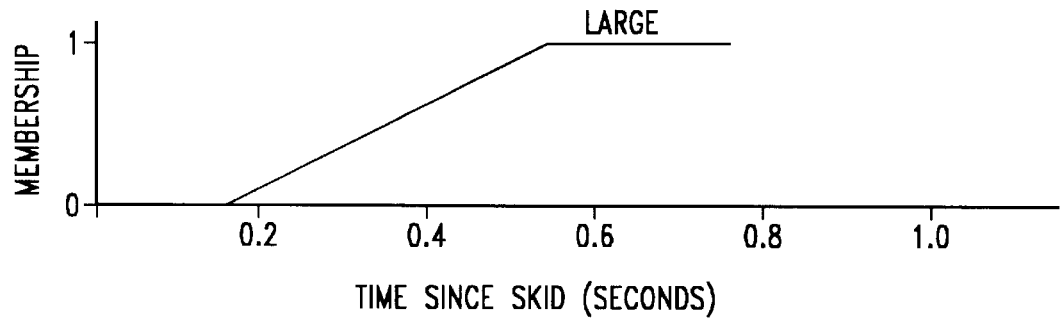

The rules are now described and the fuzzy sets shown in FIG. 5:

Gain Rules:

1. If Base Limit is Small Then Gain=2.1.
2. If Base Limit is Medium Then Gain=1.4.
3. If Base Limit is Small Then Gain=0.8.

Determine Change in Base Limit (Fuzzy Inference)

The base current level is the level to which the release current returns after a skid. This permits the system to remember the approximate current level at which a skid will occur.

The system uses the deviation to determine how the base limit will change. When the deviation is zero or very small, the base limit ramps down gradually. When the deviation is larger, the base limit ramps up gradually. Additionally, when there has not been a skid for a while, the base limit ramps down more rapidly.

There is also a rule to ensure that the base limit does not ramp up when there are oscillations in the wheel speed signal such as those caused by the truck oscillating. Rule six (below) is included to address this situation. The condition of the error being moderate and ω being positive is met a large part of the time during oscillations, and is not met very much during normal operation. Therefore, rule six keeps the base limit from ramping up during oscillations, and has little effect during normal operation.

The rules are now described and the fuzzy sets shown in FIGS. 6, A, B, C, and D.

Base Limit Rules:

1. If Deviation is Zero Then ΔBase Limit=-0.05 mA.
2. If Deviation is Small Then ΔBase Limit=0.05 mA.
3. If Deviation is Medium Then ΔBase Limit=0.25 mA.
4. If Deviation is Large Then ΔBase Limit=0.4 mA.
5. If Time Since Skid is Large ΔBase Limit Gain =-0.3 mA.
6. If Error is Moderate and ω is Positive Then ΔBase Limit=-1.2 mA.

Sum and Limit Base Limit

The new base limit is computed by adding the Δbase limit to the previous value of base limit. The new value for the base limit is then limited to a minimum of 0 mA, and a maximum of 45 mA.

Sum and Limit Antiskid Current

The new antiskid current is computed by adding the Δantiskid current to the previous value of antiskid current. This new value of antiskid current is then limited to a minimum of the base limit, and a maximum of 55 mA.

Send Current to Valve

The antiskid current is sent as a voltage to the simulation, where it is then sent through a valve driver to the antiskid valve.

What is claimed:

1. An antiskid brake control system for an aircraft for providing an antiskid control current to an antiskid valve comprising in combination:

an iterative control system responsive to wheel speed and time since touchdown;

said iterative control system further responsive to the antiskid control current generated by a previous iteration;

said iterative control system utilizing four fuzzy inference systems for determining the values of four intermediate variables to provide said antiskid control current to the antiskid valve.

2. The antiskid brake control system of claim 1 wherein said four intermediate variables are reference velocity rate limit, change in antiskid current, gain, and change in base limit.

3. A method for estimating aircraft velocity comprising the steps of:

reading wheel speed;

comparing a subsequent wheel speed reading with a previous reference velocity; and limiting the change in wheel speed to an amount determined by fuzzy inference.

4. An antiskid control system for an aircraft for providing an antiskid control current for an antiskid valve comprising in combination:

an iterative system responsive to wheel speed, time since touchdown and the antiskid control current generated by a previous iteration for providing said antiskid control current;

fuzzy logic rules for adjusting said iterative system for variation in the coefficient of friction between the wheels of said aircraft and the runway.

5. The method according to claim 3 wherein said fuzzy interference utilizes current base limit and time since touchdown as inputs.

6. An antiskid brake control system for aircraft utilizing a fuzzy system to calculate reference velocity limit;

said fuzzy inference system receiving base current limit and time since touchdown as inputs, and providing reference velocity rate limit as output.

7. An antiskid brake control system for aircraft utilizing a fuzzy system to calculate Gain;

said fuzzy inference system receiving base current limit as input and giving gain as output.

8. An antiskid brake control system for aircraft utilizing fuzzy system to calculate base current limit;

said fuzzy inference system receiving deviation of antiskid current from base limit, time since skid, wheelspeed error, and derivative of wheelspeed as inputs, and giving change in base limit as output.

9. A method of antiskid brake control for an aircraft comprising the steps of:

calculating a reference velocity by fuzzy inference;

calculating decision variables wheelspeed error, rate of change of wheelspeed error, derivative of wheelspeed, second derivative of wheelspeed, time since touchdown, time since skid, and deviation between base current limit and antiskid current limit;

calculating Δbase current by fuzzy inference;

calculating Δantiskid current by fuzzy inference;

calculating gain by fuzzy inference; and limiting antiskid current to base limit level.

10. An antiskid brake control system for an aircraft for providing an antiskid control current to an antiskid valve comprising in combination:

an iterative control system responsive to wheel speed and time since touchdown;

said iterative control system further responsive to the antiskid control current generated by a previous iteration;

said iterative control system utilizing four fuzzy inference systems for determining the values of four intermediate variables to provide said antiskid control current to the antiskid valve; and wherein said four intermediate variables are reference velocity rate limit, change in antiskid current, gain and change in base limit.

* * * * *